(12) United States Patent
Muratani

(10) Patent No.: US 7,646,882 B2
(45) Date of Patent: Jan. 12, 2010

(54) DIGITAL WATERMARK EMBEDDING APPARATUS, METHOD AND PROGRAM, AND DIGITAL WATERMARK DETECTION APPARATUS, METHOD AND PROGRAM

(75) Inventor: Hirofumi Muratani, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 707 days.

(21) Appl. No.: 10/743,533

(22) Filed: Dec. 23, 2003

(65) Prior Publication Data

US 2004/0136528 A1   Jul. 15, 2004

(30) Foreign Application Priority Data

Dec. 27, 2002   (JP)   ............... 2002-381380

(51) Int. Cl.
  G06K 9/00   (2006.01)
  H04L 9/32   (2006.01)
(52) U.S. Cl. ............... 382/100; 713/176; 380/46
(58) Field of Classification Search ............... 382/100; 713/176; 380/46
  See application file for complete search history.

(56) References Cited

U.S. PATENT DOCUMENTS

| | | | | |
|---|---|---|---|---|
| 5,889,868 | A * | 3/1999 | Moskowitz et al. | 713/176 |
| 6,282,300 | B1 * | 8/2001 | Bloom et al. | 382/100 |
| 6,522,767 | B1 * | 2/2003 | Moskowitz et al. | 382/100 |
| 6,532,541 | B1 * | 3/2003 | Chang et al. | 713/176 |
| 6,700,991 | B1 * | 3/2004 | Wu et al. | 382/100 |
| 7,007,166 | B1 * | 2/2006 | Moskowitz et al. | 713/176 |
| 2001/0010078 | A1 * | 7/2001 | Moskowitz | 713/176 |
| 2001/0022848 | A1 * | 9/2001 | Rhoads | 382/100 |
| 2002/0001395 | A1 * | 1/2002 | Davis et al. | 382/100 |
| 2002/0009208 | A1 * | 1/2002 | Alattar et al. | 382/100 |
| 2002/0071593 | A1 | 6/2002 | Muratani | |
| 2003/0070075 | A1 * | 4/2003 | Deguillaume et al. | 713/176 |
| 2003/0079222 | A1 * | 4/2003 | Boykin et al. | 725/31 |
| 2003/0112996 | A1 * | 6/2003 | Holliman et al. | 382/100 |
| 2004/0128511 | A1 * | 7/2004 | Sun et al. | 713/176 |

FOREIGN PATENT DOCUMENTS

JP   2002-142094   5/2002

OTHER PUBLICATIONS

Iwanami Mathematic Dictionary $3^{rd}$ Edition, Topological Space, pp. 22-34.

(Continued)

*Primary Examiner*—Brian P Werner
*Assistant Examiner*—Anthony Mackowey
(74) *Attorney, Agent, or Firm*—Finnegan, Henderson, Farabow, Garrett & Dunner, L.L.P.

(57) ABSTRACT

A digital watermark embedding apparatus comprises an acquisition unit configured to acquire a topological invariant as digital watermark information, key information corresponding to the digital watermark information, and a target content in which the digital watermark information is to be embedded, function generation unit configured to generate a topological function corresponding to the topological invariant, a randomizing-function generation unit configured to generate a randomizing function based on the key information, and compute a composite function by composition of the randomizing function and the topological function, and a function-embedding unit configured to embed the composite function in the target content.

22 Claims, 8 Drawing Sheets

OTHER PUBLICATIONS

Kutter; "Introduction to Watermarking Techniques" Information Hiding Techniques for Steganography and Digital Watermarking, Chapter 5, pp. 97-121, 2000.

Iwanami Suugaku Jitem, 392 "Homotopii Riron"; Nikon Suugaku Kai; pp. 1142-1151, 1985.

Kerckhoffs: Journal des Sciences Militaires, vol. IX, pp. 5-38, Jan. 1883.

Iwanami Mathematic Dictionary $3^{rd}$ Edition, Topological Space, pp. 22-34, 1985.

* cited by examiner

DIGITAL WATERMARK EMBEDDING APPARATUS, METHOD AND PROGRAM, AND DIGITAL WATERMARK DETECTION APPARATUS, METHOD AND PROGRAM

CROSS-REFERENCE TO RELATED APPLICATIONS

This application is based upon and claims the benefit of priority from the prior Japanese Patent Application No. 2002-381380, filed Dec. 27, 2002, the entire contents of which are incorporated herein by reference.

BACKGROUND OF THE INVENTION

1. Field of the Invention

The present invention relates to a digital watermark embedding apparatus, method and program for embedding digital watermark information in content, such as digitized still image data, moving picture data, voice data, and music data, and a digital watermark detection apparatus, method and program for detecting digital watermark information in content.

2. Description of the Related Art (Digital Watermarking)

Digital watermarking is a technique for embedding certain information in digital content (digital literary work data), such as digitized still image data, moving picture data, voice data, and music data, by varying the content to a degree in which its quality is not greatly degraded. For example, the identification information of a copyright holder or content user, information concerning the rights of a copyright holder, the conditions for using content, secret information needed to use content, or copy control information, etc. (hereinafter referred to as "watermark information") is embedded so that it is not easily perceived. When necessary, the thus-embedded watermark information is detected in the content and used for controlling the use of the content or for promoting the secondary use of the content. Further, it has been proposed to use watermark information for such purposes as identification or certification of a copyright holder, fingerprinting, certification of content, and monitoring of broadcasts.

(Requirements for Digital Watermarking)

For watermark information to be used to prevent illegal use of digital content, it is necessary to make the information robust (preventing the content from being lost or being illegally altered) against various operations or attack attempts that may be made on the content.

(Geometrical Distortion)

If the digital content is image data (still images or moving pictures), there is an attack attempt to erase the digital watermark embedded therein by geometrical distortion. Geometrical distortion means coordinate transformation of an image. That is, geometrical distortion changes the positions of pixels. Following a change in pixel position, some types of digital watermark information cannot be correctly detected.

Geometrical distortion is mainly classified into global transformation and local transformation. Global transformation means the scaling, rotation and parallel displacement of the whole image. Global transformation is expressed as an affine transformation. On the other hand, local transformation includes both transformation expressed by a local parameter, and transformation, such as global transformation, expressed by a parameter that does not relate to the position. In other words, global transformation is a special case of local transformation.

(Topological Digital Watermarking)

It is known that homeomorphic spaces have a constant property called "a topological invariant". Homotopy classes are examples of the amount (see, for example, Iwanami Mathematic Dictionary 3rd Edition, Topological Space, pp. 22-34; Homotopy Theory, pp. 1142-1150).

Digital watermarking may be related to the topological invariant by regarding local geometrical distortion as a homeomorphic mapping. A topological digital watermarking system is a technique for realizing robustness against local geometrical distortion (see, for example, Jpn. Pat. Appln. KOKAI Publication No. 2002-142094). In topological digital watermarking, the digital watermark is a topological invariant (e.g., a homotopy class), which is invariant under local geometrical distortion, and is expressed by a function $\psi b$ corresponding to a predetermined homotopy class b. The digital watermark is detected by computing the homotopy class b from the detected function $\psi'b$.

In conventional digital watermarking techniques, digital watermark information is embedded as a topological invariant into content in a simple manner.

BRIEF SUMMARY OF THE INVENTION

The present invention has been developed in light of the above, and aims to provide digital watermark embedding and detection apparatuses that show robustness against StirMark attack or local transformation such as D-A-D conversion, and are reliable even if all or part of the algorithm for digital watermarking are disclosed. The invention also aims to provide digital watermark embedding and detecting methods and program that are employed in the apparatuses.

According to a first aspect of the invention, there is provided a digital watermark embedding apparatus comprising: an acquisition unit configured to acquire a topological invariant as digital watermark information, key information corresponding to the digital watermark information, and a target content in which the digital watermark information is to be embedded; a function generation unit configured to generate a topological function corresponding to the topological invariant; a randomizing-function generation unit configured to generate a randomizing function based on the key information, and compute a composite function by composition of the randomizing function and the topological function; and a function-embedding unit configured to embed the composite function in the target content.

According to a second aspect of the invention, there is provided a digital watermark detection apparatus comprising: an acquisition unit configured to acquire key information corresponding to the digital watermark information, and a target content in which the digital watermark information is to be embedded; a function detection unit configured to detect a function embedded in the target content; an ordering-function generation unit configured to generate an ordering function based on the key information, and compute a composite function by composition of the ordering function and the embedded function; and a topological invariant computation unit configured to compute a topological invariant based on the composite function, and the topological invariant serving as digital watermark information.

According to a third aspect of the invention, there is provided a digital watermark embedding method comprising: acquiring a topological invariant as digital watermark information, key information corresponding to the digital watermark information, and a target content in which the digital watermark information is to be embedded; generating a topological function corresponding to the topological invariant;

generating a randomizing function based on the key information; computing a composite function by composition of the randomizing function and the topological function; and embedding the composite function in the target content.

According to a fourth aspect of the invention, there is provided a digital watermark detection method comprising: acquiring key information corresponding to digital watermark information, and a target content in which the digital watermark information is embedded; detecting a function embedded in the target content; generating an ordering function based on the key information; computing a composite function by composition of the ordering function and the embedded function; and computing a topological invariant based on the composite function, and the topological invariant serving as digital watermark information.

According to a fifth aspect of the invention, there is provided a program stored in a computer readable medium for enabling a computer to function as a digital watermark embedding apparatus, comprising: means for instructing the computer to acquire a topological invariant as digital watermark information, key information corresponding to the digital watermark information, and a target content in which the digital watermark information is to be embedded; means for instructing the computer to generate a topological function corresponding to the topological invariant; means for instructing the computer to generate a randomizing function based on the key information; means for instructing the computer to compute a composite function by composition of the randomizing function and the topological function; and means for instructing the computer to embed the composite function in the target content.

According to a sixth aspect of the invention, there is provided a program stored in a computer readable medium for enabling a computer to function as a digital watermark detection apparatus, comprising: means for instructing the computer to acquire key information corresponding to digital watermark information, and a target content in which the digital watermark information is to be embedded; means for instructing the computer to detect a function embedded in the target content; means for instructing the computer to generate an ordering function based on the key information; means for instructing the computer to compute a composite function by composition of the ordering function and the embedded function; and means for instructing the computer to compute a topological invariant based on the composite function, and the topological invariant serving as digital watermark information.

DETAILED DESCRIPTION OF THE INVENTION

An embodiment of the invention will be described in detail with reference to the accompanying drawings.

The present invention is applicable to the case of embedding various types of watermark information in content (e.g. digitized still image data, moving picture data, voice data, and music data) for various purposes (e.g. copyright protection including control of use or copy, acceleration of secondary use, etc.), and detecting them. Various types of watermark information include, for example, identification information on the copyright holder or user of the content, ownership information on the copyright holder, conditions for using content, secret information needed to use the content, copy control information, etc., individually or in combination.

Figure 1:
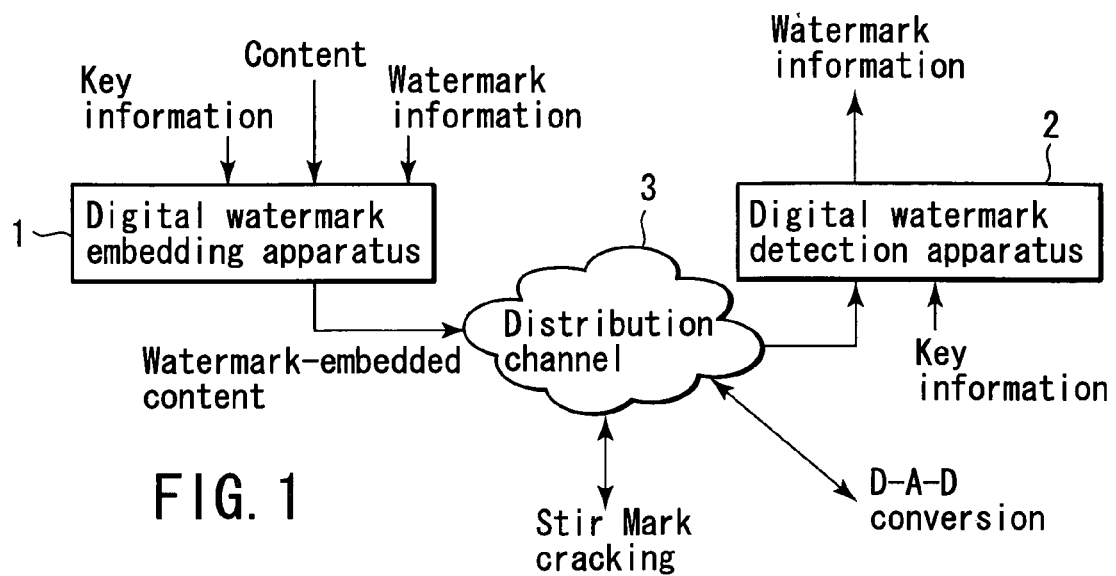
FIG. 1 is a schematic block diagram illustrating the configuration of a content circulation system including digital watermark embedding and detection apparatuses according to an embodiment of the invention.

FIG. 1 is a conceptual view illustrating a system that comprises digital watermark embedding and detection apparatuses according to the embodiment of the present invention.

A digital watermark embedding apparatus 1 is used to embed watermark information in target content. The apparatus 1 receives a target content, digital watermark information to be embedded in the target content and key information, and outputs a watermark information embedded content. The digital watermark embedding apparatus 1 is provided and managed on a content provider side.

The digital watermark embedded content obtained by the digital watermark embedding apparatus 1 is distributed through a distribution channel 3 formed of, for example, a storage medium, communication medium, etc. At this moment, in the distribution channel 3, local geometrical distortion, such as StirMark attack or D-A-D conversion, may be made on the content (local transformation may be made intentionally or unintentionally).

A digital watermark detection apparatus 2 is used to detect digital watermark information from a target content. The digital watermark detection apparatus 2 receives a target content and key information, and outputs watermark information detected in the content. The digital watermark detection apparatus 2 may be provided in a user-side content-using apparatus for protecting the copyright of the content when the content is used. Alternatively, the apparatus 2 may be provided on a content provider side so that the content provider can detect digital watermark information in distributed content.

As will be described later in detail, the digital watermark embedding apparatus 1 embeds the watermark information so that the content of the watermark information can be held even if StirMark attack or D-A-D conversion is applied to the watermark information. Therefore, even if StirMark attack or D-A-D conversion is applied to a target content in the distribution channel 3, the digital watermark detection apparatus 2 can accurately detect the watermark information embedded by the digital watermark embedding apparatus 1.

Further, only when the digital watermark detection apparatus 2 uses legitimate key information (e.g. the same key information as that used for the target content by the digital watermark embedding apparatus 1, if the common key encryption system is employed), it can correctly detect the digital watermark information embedded in the target content. Therefore, even if the algorithm for digital watermarking is disclosed, the system is still safe unless the key information is disclosed.

Although in the embodiment, the digital watermark embedding apparatus 1 receives digital content and digital watermark detection apparatus 2 outputs digital content, the digital watermark embedding apparatus 1 may have a function for converting input analog content into digital content before embedding watermark information. Alternatively, or at the same time, the digital watermark detection apparatus 2 may have a function for converting input analog content into digital content before detecting watermark information.

The digital watermark embedding apparatus 1 can be realized by hardware or software (program). Similarly, the digital watermark detection apparatus 2 can be realized by hardware or software (program).

If the content provider employs the digital watermark embedding apparatus 1 and digital watermark detection apparatus 2, the apparatuses 1 and 2 can be realized as an integrated unit.

If the digital watermark detection apparatus 2 is provided in a user-side content-using apparatus, it is desirable to safely build the digital watermark detection apparatus 2 so as to prevent users from operating, analyzing or attacking the digital watermark detection apparatus 2.

The configurations described below may be those of hardware, or those of the function modules or procedures of software (program).

Although in the embodiment, moving image data is mainly used as an example of a digital content, other media, such as still image data, voice data, etc., may be used. Concerning moving image data, local transformation, such as StirMark attack or D-A-D conversion, means geometrical distortion, if the data is processed in units of frames. On the other hand, if moving image data is processed over a plurality of frames in light of its temporal position, local transformation means both geometrical distortion and transformation with the lapse of time (spacetime transformation). In the case of still image data, local transformation means geometrical distortion of the data. Further, in the case of voice data, local transformation means transformation with the lapse of time.

In the embodiment, to impart robustness against local transformation, such as StirMark attack or D-A-D conversion, watermark information is embedded as a topological invariant in target content (for example, the pixel value of the target content is changed so that the topological invariant obtained from the target content corresponds to the watermark information). In the description below, assume that a topological invariant is directly used as watermark information, and a homotopy invariant is used as an example of the topological invariant.

Instead of directly using a topological invariant as watermark information, a watermark-information/topological-invariant conversion unit for converting given watermark information into a to-be-embedded topological invariant may be provided on the digital watermark embedding apparatus 1 side. Further, in this case, a topological-invariant/watermark-information conversion unit for converting a detected topological invariant into corresponding watermark information is provided on the digital watermark detection apparatus 2 side.

As regards the application of a topological invariant, homotopy invariant or homotopy class to digital watermark information, the idea disclosed in Jpn. Pat. Appln. KOKAI Publication No. 2002-142094 can be utilized.

Figure 2:
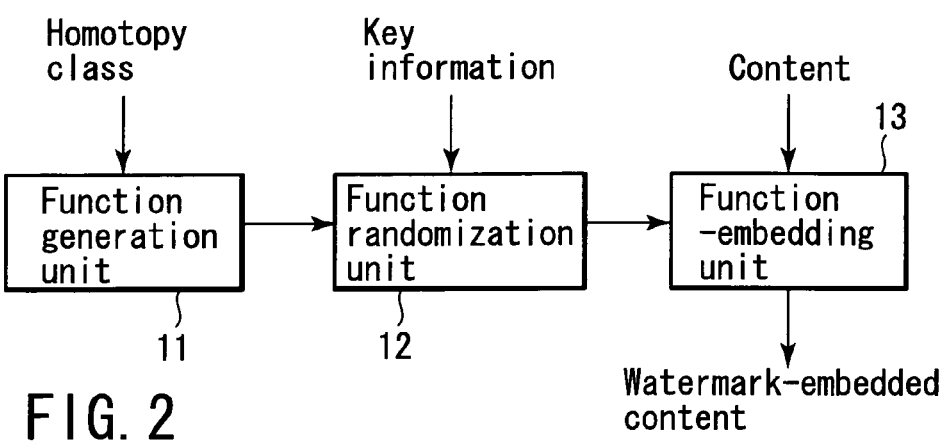
FIG. 2 is a block diagram illustrating a configuration example of the digital watermark embedding apparatus of the embodiment.

FIG. 2 shows a configuration example of the digital watermark embedding apparatus according to the embodiment.

The digital watermark embedding apparatus of the embodiment receives a digital content (in the embodiment, a moving picture), a homotopy class as to-be-embedded digital watermark information, and key information, and outputs content with the digital watermark information embedded therein.

As seen from FIG. 2, the digital watermark embedding apparatus of the embodiment comprises a function generation unit 11, function randomization unit 12 and function-embedding unit 13.

Figure 3:
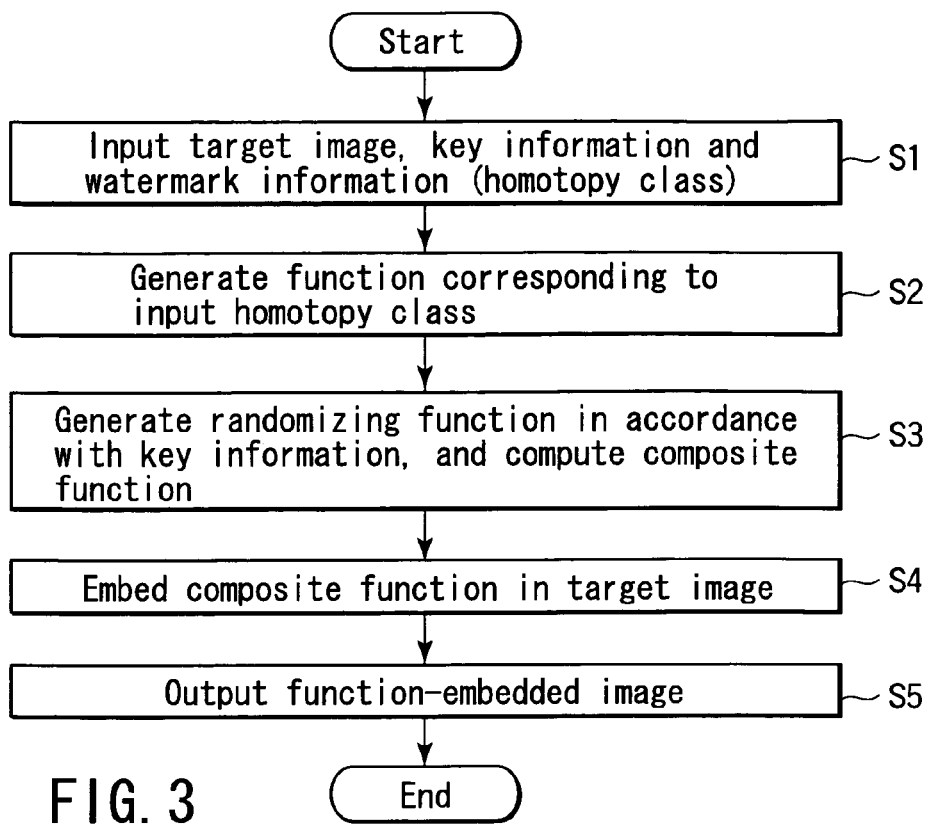
FIG. 3 is a flowchart illustrating a procedure example of the digital watermark embedding apparatus of the embodiment.

FIG. 3 shows a procedure example of the digital watermark embedding apparatus of the embodiment.

Firstly, a target image, in which digital watermark information is to be embedded, key information and watermark information (in the embodiment, a homotopy class) are input (step S1).

Subsequently, a topological function corresponding to the input homotopy class is generated (step S2).

A randomization function is generated in accordance with the input key information, and a composite function is generated from this randomization function and the topological function corresponding to the homotopy class (step S3).

The thus-generated composite function is embedded in the target image (step S4).

An image with digital watermark information embedded therein is output (step S5).

The function of the function generation unit 11 will be described.

Here, an image is composed of pixels, and the image includes a moving picture.

Each pixel is defined by a corresponding position in the image and the color at the position.

Space B formed of pixel positions in an image is called a base space, while space C formed of pixel colors is called a color space. For example, in the case of a still or moving image of one frame, the base space B is a two-dimensional limited area. In the case of a color image, the color space C is a three-dimensional limited area.

Assume that a predetermined subspace $T \subset C^n$ is created in a product space $C^n (= C \times C \times \ldots \times C)$ formed of a number n ($n \geq 1$) of color spaces C, and is called a "target space T".

Further, assume that a predetermined subspace S ⊃ T which contains the target space T is set in the color space C, and is called a randomized space. In strict, the spaces T, S, C″ are not topological spaces because they are discrete. However, in the embodiment, they are considered as topological spaces approximately.

In the embodiment, an invariant corresponding to the homomorphisms of the base space B is regarded as watermark information. More specifically, a homotopy class, to which a mapping from the base space B to the target space T corresponds, is used as a topological invariant.

When homotopy class b as to-be-embedded information has been input, the function generation unit 11 generates a topological function ψb: B→T that corresponds to the homotopy class b.

The function of the function randomization unit 12 will now be described.

The function randomization unit 12 generates a mapping from a randomized space S to another randomized space S, i.e., a function (randomizing function) gk: S→S that varies in accordance with input key information k. After that, the unit 12 generates the composite function gk○ψb: B→S of the function gk based on the key information k, and the function ψb corresponding to the homotopy class b and generated by the function generation unit 11 (symbol "○" represents the composite function of the functions specified before and after the symbol).

The function of the function-embedding unit 13 will be described.

The function-embedding unit 13 embeds, in a target image, the composite function gk○ψb generated by the function randomization unit 12. This embedding operation is performed to change the image so that a value in the randomized space S, which corresponds to each point in the base space B, is given by the composite function. After that, the target image with digital watermark information embedded therein is output.

Figure 4:
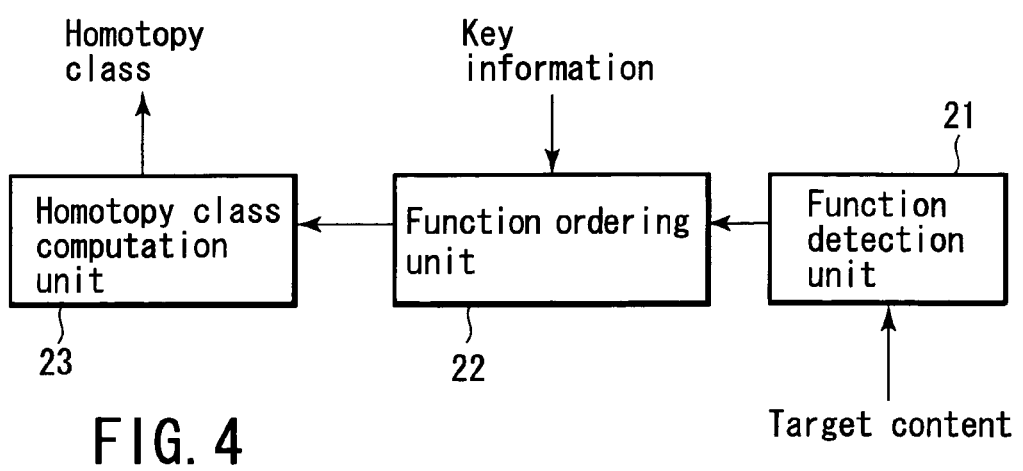
FIG. 4 is a block diagram illustrating a configuration example of the digital watermark detection apparatus of the embodiment.

FIG. 4 shows a configuration example of the digital watermark detection apparatus of the embodiment.

The digital watermark detection apparatus of the embodiment receives a digital content (in the embodiment, a moving picture) and key information, and outputs a homotopy class detected as digital watermark information.

As seen from FIG. 4, the digital watermark detection apparatus of the embodiment comprises a function detection unit 21, function-ordering unit 22 and homotopy class computation unit 23.

Figure 5:
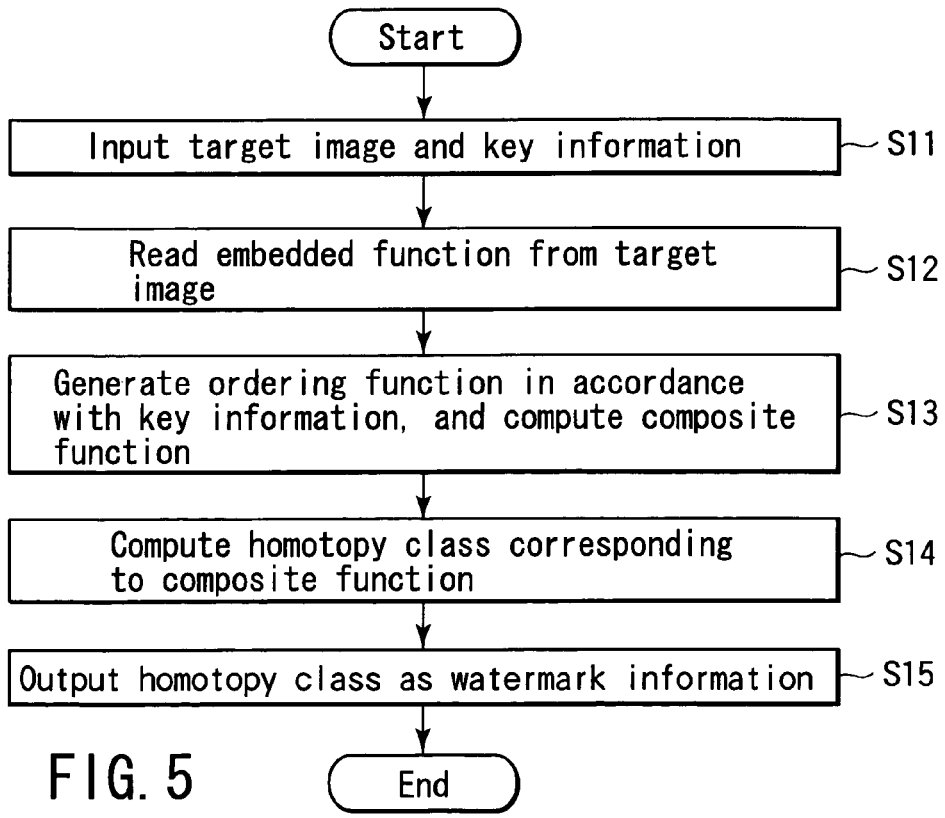
FIG. 5 is a flowchart illustrating a procedure example of the digital watermark detection apparatus of the embodiment.

FIG. 5 shows a procedure example of the digital watermark detection apparatus of the embodiment.

Firstly, a target image, in which digital watermark information is to be detected, and key information are input (step S11).

Subsequently, the function embedded in the target image is detected (step S12).

An ordering function corresponding to the above-mentioned randomizing function is generated in accordance with the input key information, and the composite function of this ordering function and embedded function is generated (step S13).

A homotopy class corresponding to the generated composite function is computed (step S14).

The computed homotopy class is output as digital watermark information (step S15).

The function of the function detection unit 21 will be described.

Upon receiving a target image, the function detection unit 21 detects, in the image, a value in a randomizing space S corresponding to each point in the base space S, thereby acquiring the embedded function Φ: B→S.

The function of the function-ordering unit 22 will be described.

Like the function-randomizing unit 12, the function-ordering unit 22 generates a mapping from a randomized space S to another randomized space S, i.e., a function $gk^{-1}$: S→S that varies in accordance with input key information k. $gk^{-1}$ is the inverse function of gk. That is, $gk^{-1}○gk=1$.

Further, the function-ordering unit 22 generates the composite function $gk^{-1}○Φ$: B→S of the ordering function gk based on the key information k, and the embedded function Φ generated by the function generation unit 11.

If the detection target is an image with digital watermark information embedded therein, and the function-ordering unit 22 uses the same key information as that used by the function-randomizing unit 12 of the digital watermark embedding apparatus 1, the composite function Ξ: B→S generated by the function-ordering unit 22 is $Ξ=gk^{-1}○Φ= gk^{-1}○gk○ψb=ψb$. ψb represents a function (ψb: B→T) corresponding to the homotopy class b given as digital watermark information. Accordingly, the range of the composite function Ξ is expected to exist in the target space T. In other words, Ξ: B→T.

When the function-ordering unit 22 uses, for the target image, key information k' different from that used by the function-randomizing unit 12 of the digital watermark embedding apparatus 1, $Ξ'=gk'^{-1}○Φ=gk'^{-1}○gk○Φb$ is established. In general, $Ξ'≠ψb$. This does not assure that the range of the composite function Ξ' exists in the target space T. Therefore, it is difficult to determine whether the target content contains digital watermark information, and to detect correct Ξ (accordingly, it is difficult to know the correct content of the embedded digital watermark information).

The function of the homotopy class computation unit 23 will be described.

The homotopy computation unit 23 computes, from the composite function Ξ: B→T acquired by the function-ordering unit 22, a homotopy class corresponding to the composite function, and outputs the computation result as the acquired digital watermark information.

In the embodiment, a description has been given of the case where the key information used by the digital watermark embedding apparatus 1 to determine the randomizing function is the same as that used by the digital watermark detection apparatus 2 to determine the ordering function. However, if the randomizing function generated by the embedding apparatus 1 can be made reverse to the ordering function generated by the detection apparatus 2, the apparatuses 1 and 2 may use different key information items.

The embodiment will be described in more detail.

Figure 6:
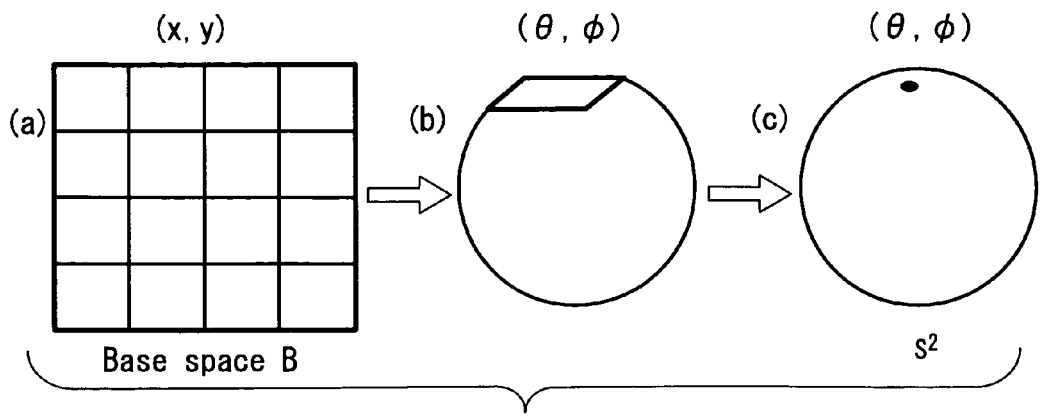
FIG. 6 is a view useful in explaining how a base space is considered to be equivalent to a two-dimensional sphere.

The base space B formed of the positions of the pixels contained in an image is originally a two-dimensional limited area formed of, for example, (512×512) pixels. However, if the base space S is deformed so that its periphery can be considered equivalent to one point, it can be considered to be a two-dimensional sphere $S^2$. FIG. 6 illustrates this idea.

As a result of the above consideration, the coordinates of the base space B can be expressed by the polar coordinates, Euler's angle, (θ, φ) of a two-dimensional sphere (θ∈[0, π], φ∈[0, 2π]). Assuming that the original coordinates of the base space B are (x, y), and x∈[0, W], φ∈[0, H]. W and H represent the width and height of an image, respectively. At this time, (θ, φ) and (x, y) can be easily transformed from one to another by a simple coordinate transformation. The coordinate transformation is given, for example, by the following equations:

$\theta = 2 \arctan \rho$ $\cos \phi = u/\rho$ $\sin \phi = v/\rho$ where $u = \tan \{\pi(x/W - \frac{1}{2})\}$ $v = \tan \{\pi(y/H - \frac{1}{2})\}$ $\rho = [u^2 + v^2]^{1/2}$ Differences in density are utilized in place of differences in pixel color (i.e., a monochrome image is used as an example). Accordingly, the color space C is a one-dimensional area C=[0, 256) related to luminance only.

Figure 7:
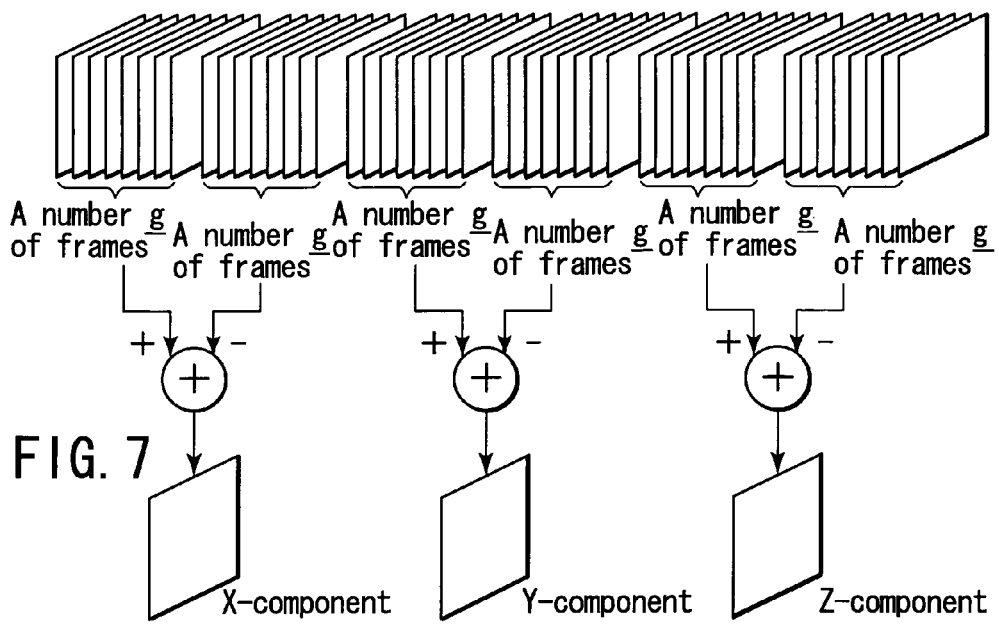
FIG. 7 is a view useful in explaining a method example for computing a luminance difference value, employed in the embodiment when a moving picture is a target content.

A consideration will now be given to a product space $C^{6g}$ obtained from a number 6g (g is a predetermined integer) of frames. The number 6g of frames are divided into six groups (one group consists of a number g of frames). In the first group (G0) and next group (G1), the sum of the luminance values of the group G1 is subtracted from that of the luminance values of the group G0 in units of base space B points. Assume that the resulting value is X. The same operation is performed for the remaining groups G2 and G3 and groups G4 and G5. In these cases, assume that the resultant values are Y and Z, respectively. Thus, three values X, Y and Z are acquired for each point of the base space B. FIG. 7 shows this operation. This manner of grouping is just an example, and other grouping methods may be employed. It is sufficient if the membership relationship between the frames and groups is preset.

A space S (i.e., a predetermined subspace S included in the color space C and including a target space T) is created, in which the three values X, Y and Z are considered X, Y and Z components.

If in each of the six groups, the sum of the luminance values of the number g of frames for each point of the base space B is expressed by f0, f1, f2, f3, f4, f5: B→[0, 256g), the X, Y and Z components are given by f0-f1, f2-f3 and f4-f5, respectively. Each of f0-f1, f2-f3 and f4-f5 will hereinafter be referred to as a "luminance difference", generically.

The coordinates (X, Y, Z) of the space S are X∈[−256g, 256g), Y∈[−256g, 256g), Z∈[−256g, 256g) (strictly, X, Y, Z∈[−255g, 255g]).

A two-dimensional sphere $S^2$ with a diameter of ε is created in the space S, and set as a target space T.

Figure 8:
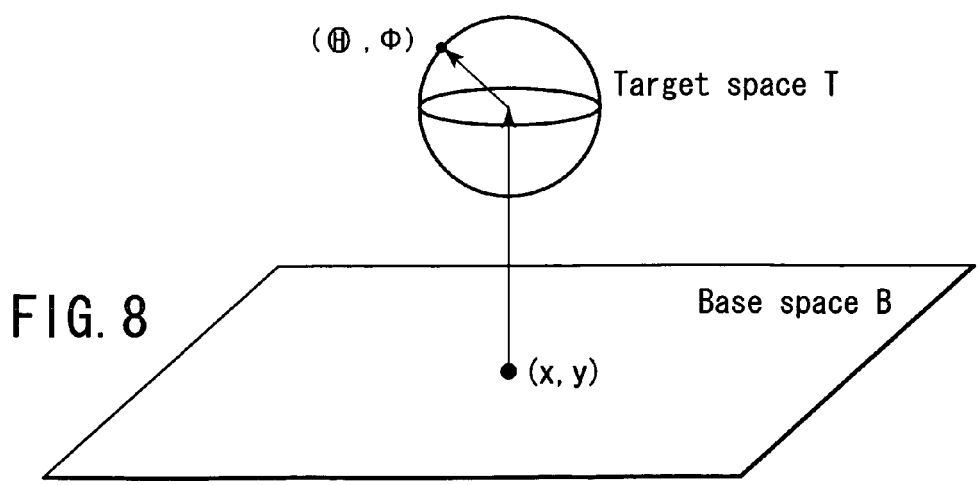
FIG. 8 shows examples of the base space and target space.
Figure 9:
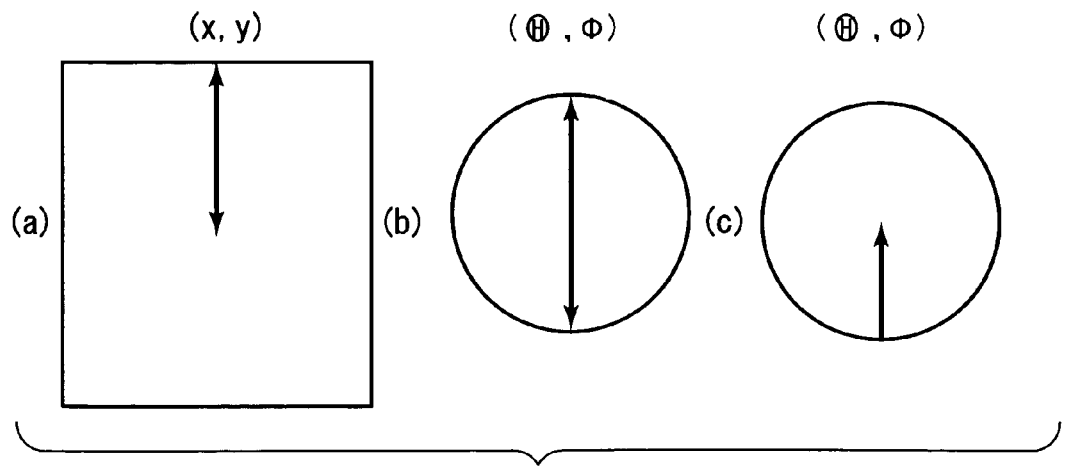
FIG. 9 is a view useful in explaining the correspondence between one circle around the equator in the base space, and one circle around the equator in the target space.
Figure 10:
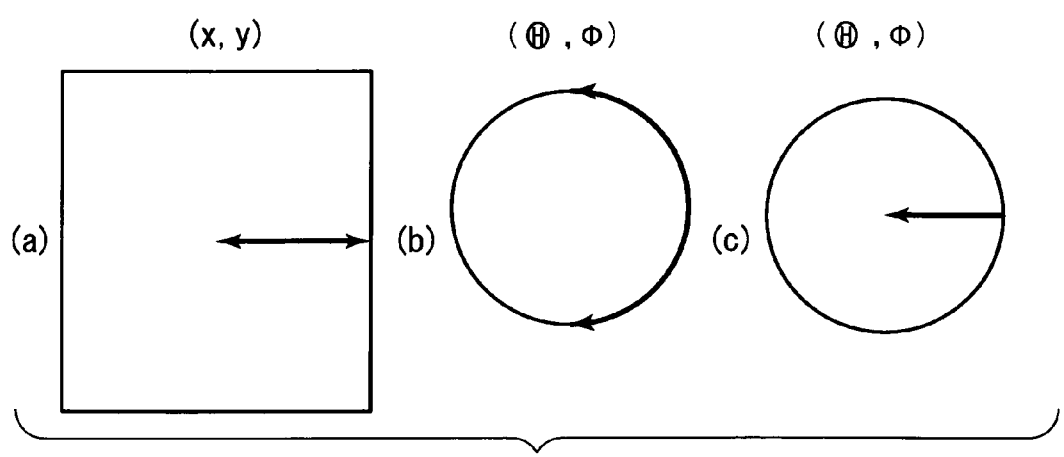
FIG. 10 is a view useful in explaining the correspondence between one circle around the equator in the base space, and one circle around the equator in the target space.
Figure 11:
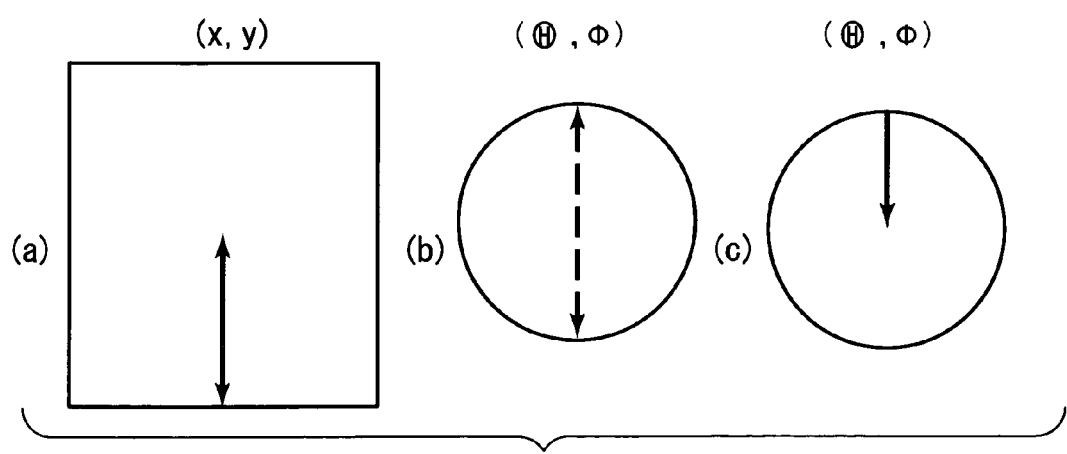
FIG. 11 is a view useful in explaining the correspondence between one circle around the equator in the base space, and one circle around the equator in the target space.
Figure 12:
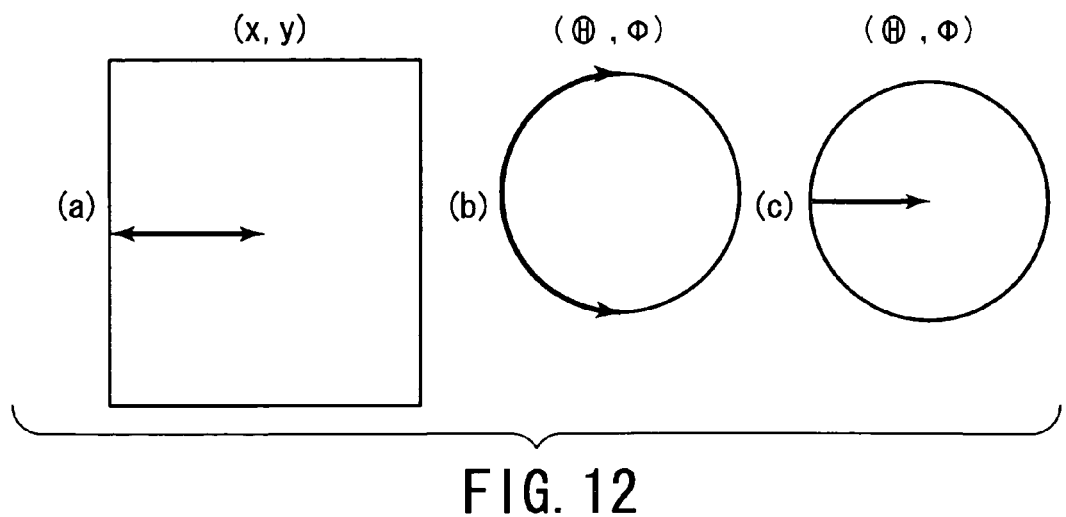
FIG. 12 is a view useful in explaining the correspondence between one circle around the equator in the base space, and one circle around the equator in the target space.

Polar coordinates (Θ, Φ) represent the target space T (Θ∈[0, π), Φ∈[0, 2π)). The coordinates (Θ, Φ) in the target space T can be expressed using the coordinates (X, Y, Z) of the space S in the following manner:

$X = \sin \Theta \cdot \cos \Phi$ $Y = \sin \Theta \cdot \sin \Phi$ $Z = \cos \Theta$ Concerning an image formed of the luminance values of a number 6g of images, a point in the target space T is assigned to each point in the base space B. This is illustrated in FIG. 8.

The image corresponding to the luminance values of the number 6g of images is defined as a mapping from $S^2$ to $S^2$.

In this case, the homotopy class used as digital watermark information is the equivalence class $\pi_2(S^2)$ of a homotopy equivalence between mappings from a two-dimensional sphere $B = S^2$ to a two-dimensional sphere $T = S^2$. It is known that $\pi_2(S^2) = ZZ$. ZZ represents a set of rational integers, and == means "isomorphism as a group". Thus, the digital watermark information is given as an integer. In light of this, watermark information can be embedded by changing an image so that an element of a homotopy group will express the watermark information.

In FIG. 6, when the homotopy class b=1, if the upper left corner of the image is the origin, the outer periphery (edge portion) of the image corresponds to (0, 0, 1) of the two-dimensional sphere, i.e., the North Pole, the center of the image corresponds to (0, 0, −1) of the two-dimensional sphere, i.e., the South Pole, and the other portions of the image continuously correspond to the other portions of the two-dimensional sphere. In other words, one circle around the equator of the base space in FIG. 6 corresponds to one circle around the equator of the target space of FIG. 8.

FIGS. 9-12 show the correspondence between the base space and target space. In (a) of each figure, the bidirectional arrow indicates a portion of the two-dimensional sphere corresponding to a certain meridian in the base space. In (b) and (c), the arrow indicates the position in the target space that corresponds to the value embedded in the portion indicated in (a). Further, (b) illustrates the target space viewed from the equator, while (c) illustrate the target space viewed from the North Pole.

The same can be said of the case where the homotopy class b=−1, except that the direction of one circle around the equator in the target space is opposite to that assumed when b=1. Further, when b=2 or −2, one circle around the equator in the base space corresponds to two circles around the equator in the target space.

In the embodiment, the pixel values are changed so that the luminance difference between corresponding pixels corresponds to the homotopy class b, thereby embedding the homotopy class b.

Figure 13:
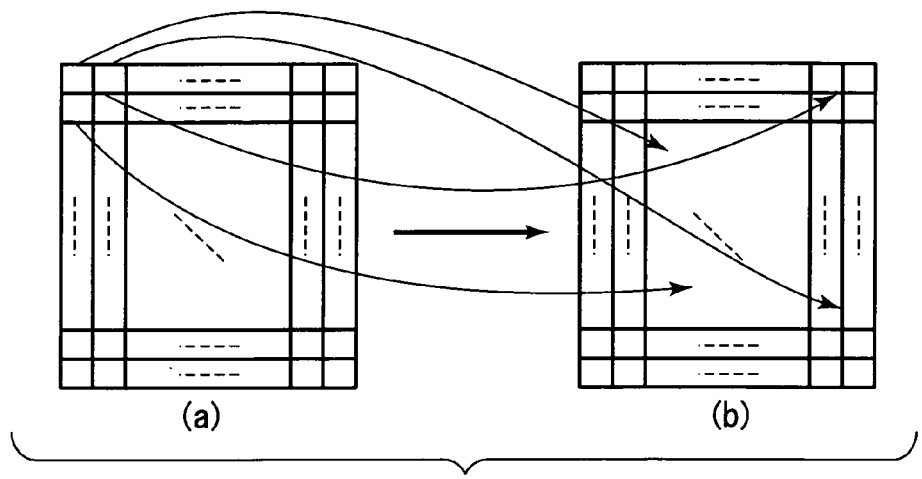
FIG. 13 is a view useful in explaining randomization using key information in the embodiment.
Figure 14:
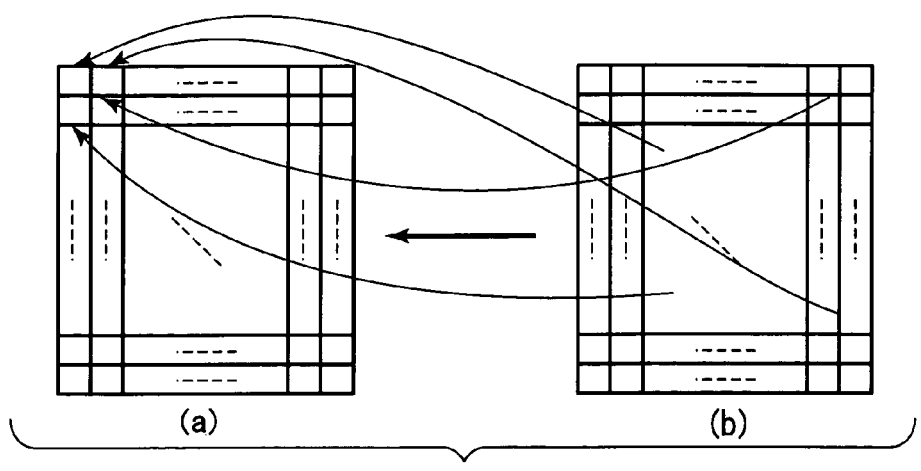
FIG. 14 is a view useful in explaining an ordering process using key information in the embodiment.

However, in the embodiment, randomization of the value to be embedded in each pixel is performed based on key information, before digital watermark information is embedded in an image, as will be described later in detail. In other words, the keyed randomization S→S is performed as shown in (b) of FIG. 13, before to-be-embedded values are correctly embedded in the pixel positions as shown in (a) of FIG. 13. The spaces depicted in FIGS. 13(a) and (b) are the randomized space S defined as satisfying T⊂S⊂C". In this state, even if the same detection algorithm is used, meaningful information cannot be acquired, since one circle around the equator in the base space merely corresponds to random positions in the target space. In other words, not only a correct homotopy class, i.e., digital watermark information, cannot be acquired, but also the existence of digital watermark information itself cannot be detected. Only when the key information used for embedding is known, ordering as shown in FIG. 14 can be performed to detect an embedded value corresponding to each pixel position, therefore a correct homotopy class, i.e., digital watermark information, can be acquired.

Thus, even if the algorithm for acquiring digital watermark information is disclosed, the digital watermark information cannot be detected unless key information is disclosed.

Figure 15:
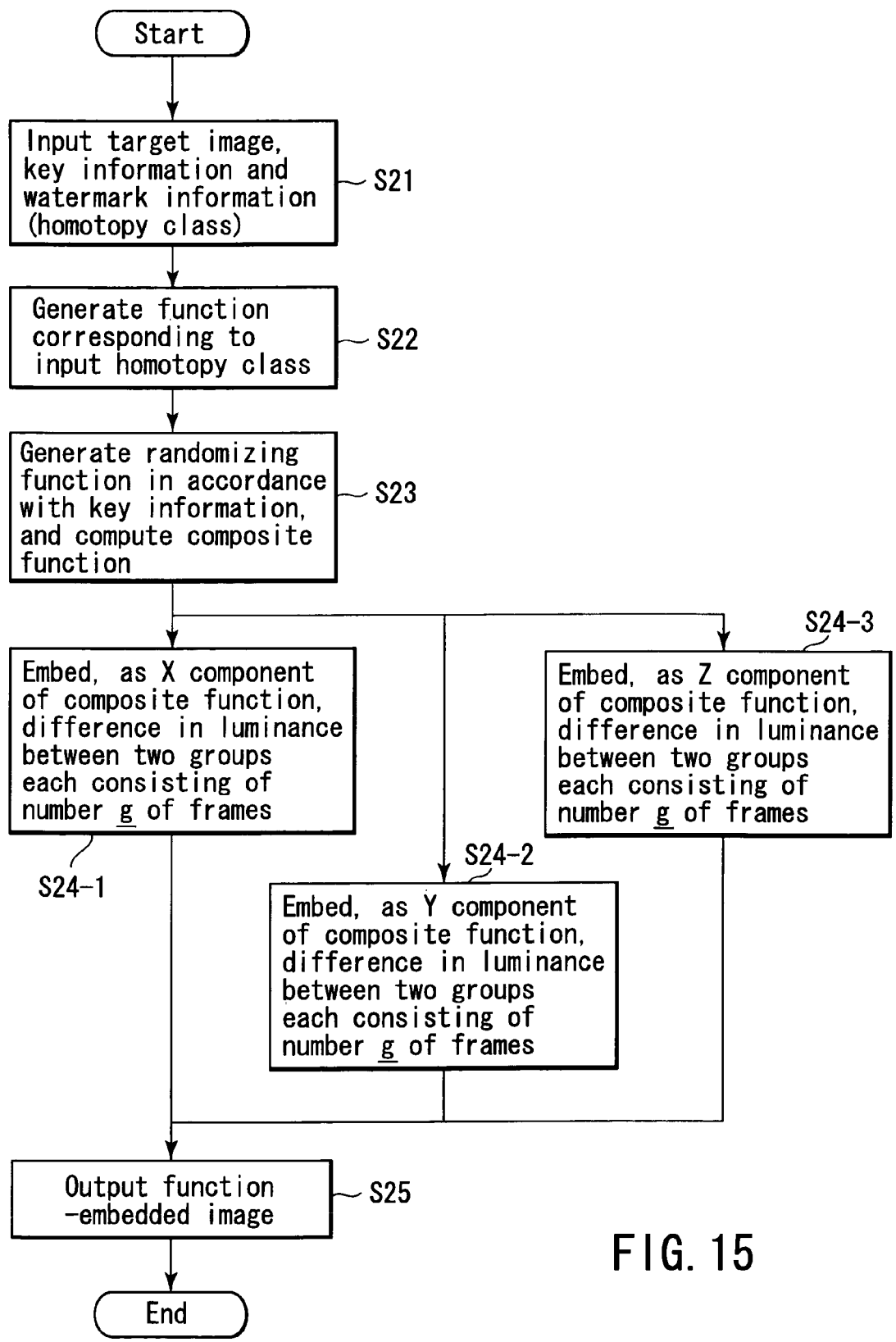
FIG. 15 is a flowchart useful in explaining a procedure example of the digital watermark embedding apparatus of the embodiment.

FIG. 15 is a flowchart useful in explaining a procedure example of the digital watermark embedding apparatus of the embodiment.

Firstly, a target image, in which digital watermark information is to be embedded, a homotopy class as to-be-embedded digital watermark information, and key information are supplied to the digital watermark embedding apparatus (S21).

Subsequently, the function generation unit 11 generates the function corresponding to the supplied homotopy class (S22).

An operation example of the function generation unit 11 will be described.

The function generation unit 11 comprises an X-component generation section, Y-component section and Z-component generation section (not shown). Various types of functions can be employed. For example, the following can be employed:

$$\Theta = \theta \quad (1)$$

$$\Phi = b\phi \pmod{2\pi} \quad (2)$$

where b represents a homotopy class as digital watermark information, and $b \in ZZ = \pi_2(S^2)$.

A function other than the above may be used as the function corresponding to the homotopy class. Further, a non-periodical function may be used.

Furthermore, the function may be selected from functions beforehand prepared, which is estimated to least influence content by setting topological invariants for the content, using the respective functions.

The values (X, Y, Z) corresponding to a point in the target space T are related to the values $(\Theta, \Phi)$ by a certain function. By the above equations, the values $(\Theta, \Phi)$ are related to the values $(\theta, \phi)$ in the space $S^2$ considered equivalent to the base space B. The values (X, Y, Z) corresponding to each point in the base space B can be computed by combining the elementary functions in the equations. Computation using elementary functions can be realized referring to an input/output correspondence table concerning the functions.

Thus, the function generation unit 11 outputs the values (X, Y, Z) corresponding to each point in the base space B, when digital watermark information $b \in ZZ$ is input.

After that, the function randomization unit 12 generates a randomization function in accordance with key information supplied thereto, thereby computing the composite function of this function and the function generated by the function generation unit 11 (S23).

An operation example of the function randomization unit 12 will be described.

The function randomization unit 12 generates a randomization function when key information k is input.

The randomization function is a mapping from a space S to another space S, the mapping being varied in accordance with the value of the key information.

An example will be described.

A space S is divided into 256 blocks.

To designate 256 blocks in each coordinate, 8 bits are needed. Therefore, to designate all the blocks of the three coordinates (X, Y, Z), 24 bits are needed. When 24-bit information indicative of the coordinates (X, Y, Z) is designated, all zones in one space S are designated. In this case, replacement of the zones is performed in accordance with key information. To this end, it is sufficient if the bijective mapping function that outputs 24-bit information when having received 24-bit information is made to depend upon key information. In light of this, the embodiment employs a method for constructing a block cipher.

A method utilizing a Feistel network is one of the block cipher construction methods. For example, DES (data encryption standard) is one of the methods.

Figure 16:
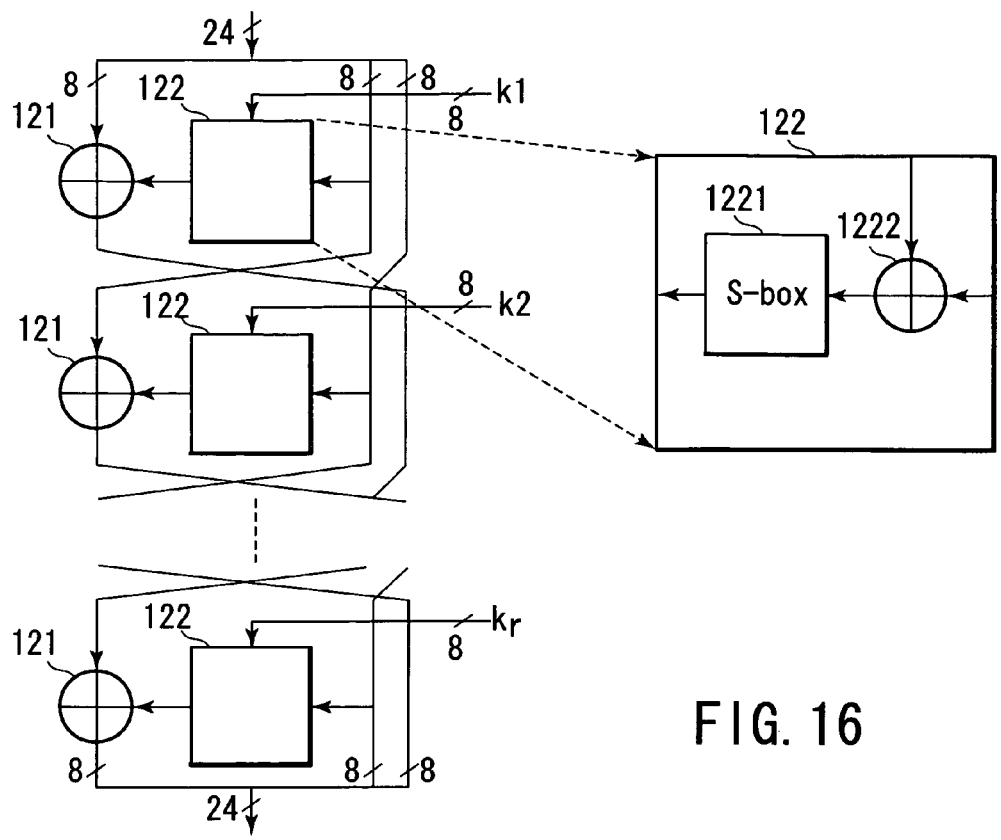
FIG. 16 shows a configuration example of a function randomization unit.

The embodiment employs the structure as shown in FIG. 16, which utilizes a Feistel network.

In FIG. 16, reference numeral 121 denotes a bitwise exclusive OR unit. In the element denoted by reference numeral 122, reference numeral 1221 denotes an S-box, and 1222 denotes a bitwise exclusive OR unit. The S-box is an 8-input/ 8-output bijective function unit and performs random transformation. By repeating the same operation a number r of times, the input and output of the S-box can have a random relationship. "k1" to "kr" represent key information items that constitute key information k. The key information k has an 8r bit length. The randomizing function gk is used to replace the above-mentioned zones.

From the upper portion of the structure shown in FIG. 16, the values computed using the function generated by the function generation unit 11 are input. From the lower portion of the structure of FIG. 16, the values computed on the basis of the values input to the randomizing function are output.

The function randomization unit 12 generates the composite function $gk \bigcirc \psi b$ for a mapping from the base space B to a space S, from the function $\psi b$ generated by the function generation unit 11 for a mapping from the base space B to the target space T, and the randomizing function gk for a mapping from a space S to another space S ($S \supseteq T$). This is performed by shifting a point in the target space T corresponding to each point in the base space B, to a corresponding point in the space S in accordance with the correspondency determined by the randomizing function.

Although in the above description, the same randomizing function is used for the X-, Y- and Z-components, different randomizing functions may be used for them. In this case, in the ordering process described later, different ordering functions corresponding to the different randomizing functions are used for the X-, Y- and Z-components.

Each of the X-, Y- and Z-components of the composite function is extracted on the basis of two groups each consisting of a number g of frames, and is embedded (S24-1, S24-2, S24-3). Lastly, a target image with digital watermark information embedded therein is output (S25).

An operation example of the function-embedding unit 13 will be described.

The function-embedding unit 13 embeds, in a target image, the composite function $gk \bigcirc \psi b: B \rightarrow S$ output from the function randomization unit 12.

As described above, a number 6g of frames are divided into six groups G0-G5, and the X-, Y- and Z-components of the composite function are embedded in a corresponding pair of groups G0 and G1, G2 and G3, and G4 and G5, in the following manner:

[X-Component]
Group G0: f0→f0+($\epsilon$/2)[gk○$\psi$b]x
Group G1: f1→f1−($\epsilon$/2)[gk○$\psi$b]x
[Y-Component]
Group G2: f2→f2+($\epsilon$/2)[gk○$\psi$b]y
Group G3: f3→f3−($\epsilon$/2)[gk○$\psi$b]y
[Z-Component]

Group G4: f4→f4+($\epsilon$/2)[gk○$\psi$b]z

Group G5: f5→f5−($\epsilon$/2)[gk○$\psi$b]z

If, for example, the luminance difference of the group G0 detected before embedding is f0 concerning the X-component, embedding is performed by changing each pixel value of each frame so that the luminance difference obtained after embedding will be f0+($\epsilon$/2) [gk○$\psi$b]x.

Embedding of data in each fi may be performed so that embedding is performed uniformly for a number g of frames belonging to the group, or so that embedding strength is varied in units of frames. Further, whether uniform embedding or ununiform embedding is performed may be determined in units of points in the base space B. Alternatively, the strength of embedding may be changed in units of points in the base space B.

Furthermore, digital watermark information may be embedded in a predetermined intermediate bit plane (which usually consists of a series of bits) included in all bits corresponding to all pixels, if this bit plane is not easily influenced by noise, and embedding of watermark information in the bit plane does not significantly degrade the image quality.

Figure 17:
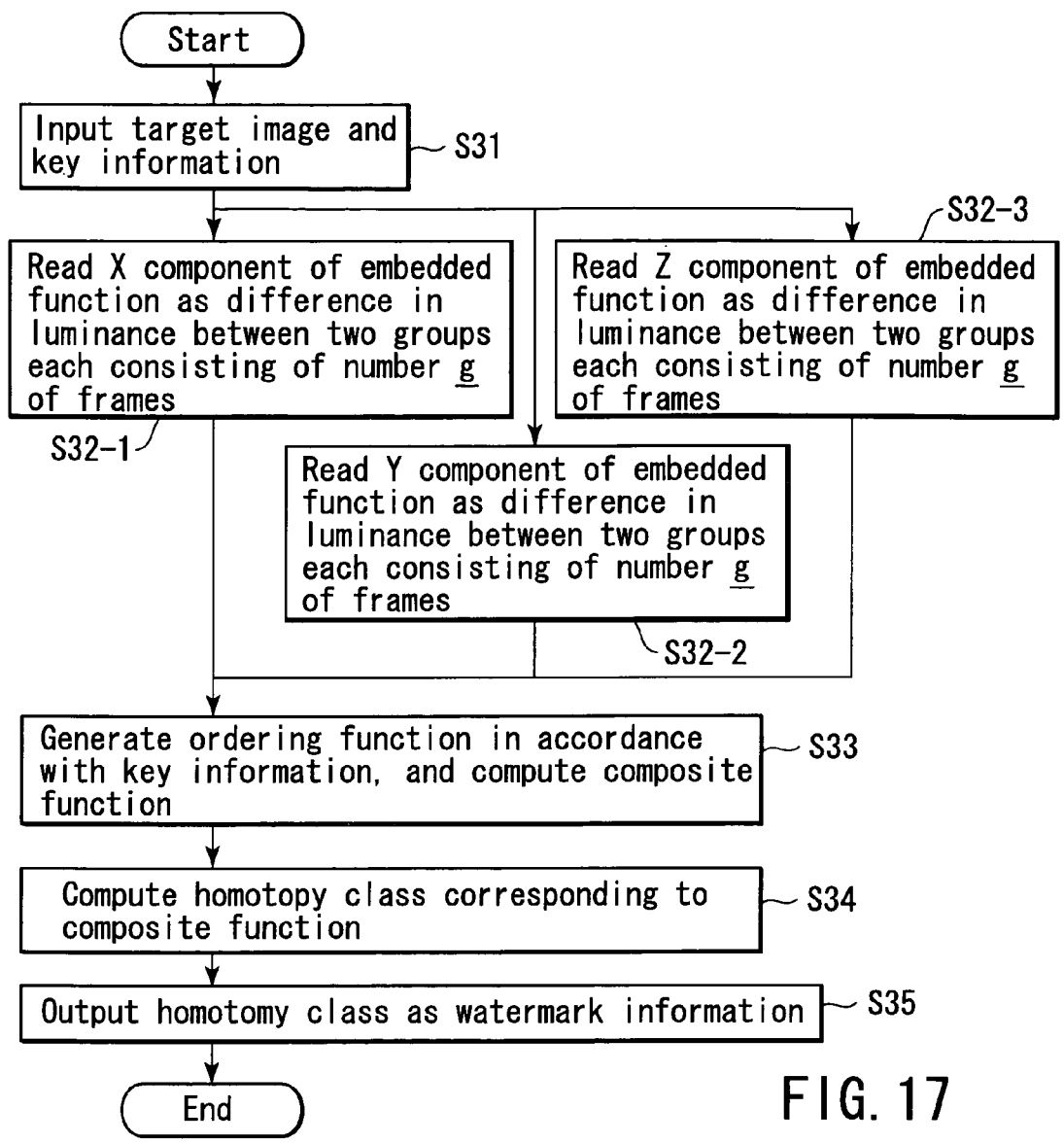
FIG. 17 is a flowchart useful in explaining a procedure example of the digital watermark detection apparatus of the embodiment.

FIG. 17 illustrates a procedure example of the digital watermark detection apparatus of the embodiment.

Firstly, the digital watermark detection apparatus is supplied with a target image, in which digital watermark information is detected, and key information used for embedding the digital watermark information (S31).

Subsequently, the function detection unit 21 extracts the X-, Y- and Z-components of the embedded function based on the respective two groups each consisting of the number g of frames (S32-1, S32-2, S32-3).

An operation example of the function detection unit 21 will be described.

The function detection unit 21 computes the X-, Y- and Z-components from the number 6g of frames as shown in FIG. 7. Since the constant "ε" is multiplied to each of the components when they are embedded, 1/ε is multiplied to each component when it is detected.

Thus, the function Φ: B→S is determined.

As an expression example of a function, there is a method for listing function values in relation to respective points in the base space B.

After that, the function-ordering unit 22 generates an ordering function in accordance with the supplied key information, and computes the composite function of this ordering function and the function extracted by the function detection unit 21 (S33).

The function-ordering unit 22 generates the ordering function in accordance with the supplied key information k. If the same key information as that used for embedding is supplied, the ordering function is the reverse function of the randomizing function.

The function randomization unit 12 realizes the randomizing function by the configuration shown in FIG. 16, using a Feistel network. On the other hand, the reverse function of the randomizing function can be realized by the configuration shown in FIG. 18.

Figure 18:
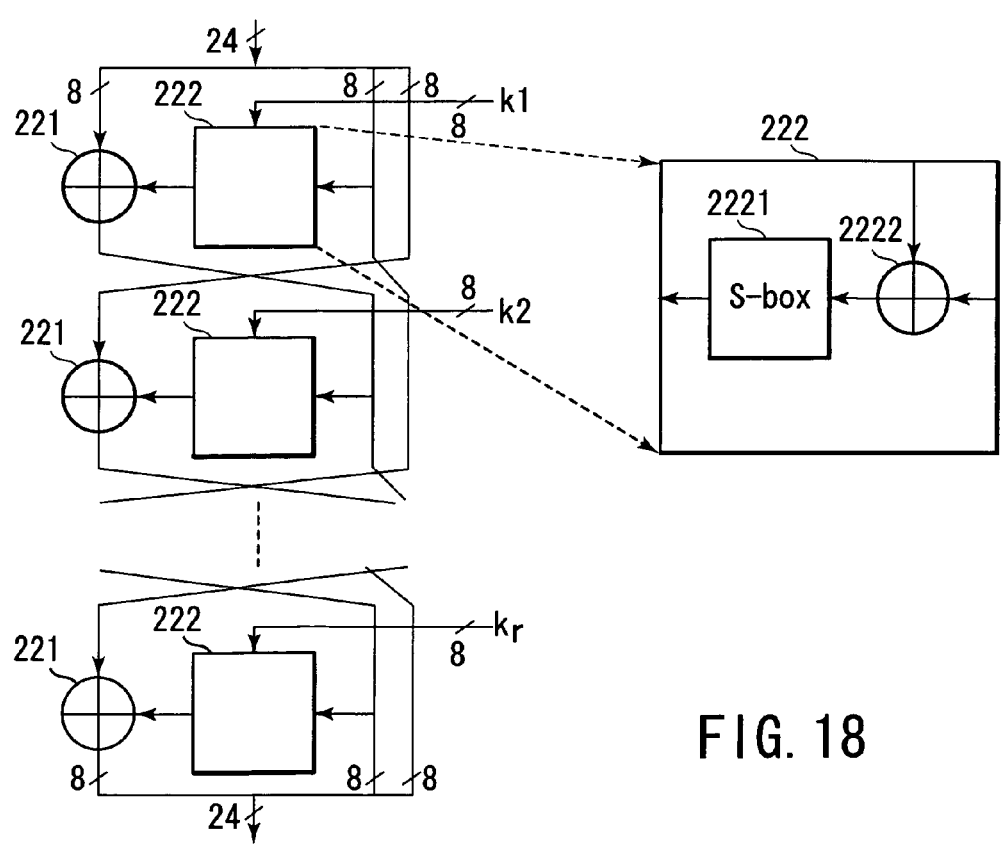
FIG. 18 shows a configuration example of a function-ordering unit in the embodiment.

In FIG. 18, reference numeral 221 denotes a bitwise exclusive OR unit. In the element denoted by reference numeral 222, reference numeral 2221 denotes an S-box, and reference numeral 2222 denotes a bitwise exclusive OR unit. "k1" to "kr" represent key information items.

From the upper portion of the structure shown in FIG. 18, the values detected using the function generated by the function detection unit 21 are input. From the lower portion of the structure of FIG. 18, the values computed on the basis of the values input to the ordering function are output.

After that, the homotopy class computation unit 23 computes a homotopy class from the obtained composite function (S34). Lastly, the computed homotopy class is output as digital watermark information (S35).

The composite function computed by the function-ordering unit 22 is given by $$ff=(X,Y,Z)=(\sin\Theta\cdot\cos\Phi, \sin\Theta\cdot\sin\Phi, \cos\Theta)$$

If the same key information as that used for embedding is supplied to the function-ordering unit 22, the resultant composite function is the function ($\psi$b: B→T) that corresponds to the homotopy class b generated by the function generation unit 11 of the digital watermark embedding apparatus and given as digital watermark information.

The homotopy class b (ff) corresponding to the composite function is given by $$b(f\!f)=(1/4\pi)\int_0^{2\pi}d\theta\int_0^{\pi}d\phi f\!f\cdot\partial f\!f/\partial\theta\times\partial f\!f/\partial\phi$$

where $\theta$ and $\phi$ represent the coordinates in the two-dimensional sphere $S^2$ considered equivalent to the base space B. Further, in the vector operation, "·" and "X" represent "inner product" and "outer product", respectively in a space S when the X-, Y- and Z-coordinates are considered orthogonal coordinates. "0" and "2π" of $\int_0^{2\pi}$ indicate that the range of the integral is 0 to 2π.

If the homotopy class b(ff) is expressed by the integration in the original base space B, the following equation is given:

$$b(f\!f)=(1/4\pi)\int_0^{W}d\theta\int_0^{H}dy f\!f\cdot\partial f\!f/\partial x\times\partial f\!f/\partial y$$

In an actual image, the base space B is a discrete space, therefore in the above equation, each integral is replaced with a sum, and each differential is replaced with a difference. In this case, the homotopy class b(ff) is given by $$b(f\!f)=(1/4\pi)\Sigma_{x=0}^{W-1}\Sigma_{y=0}^{H-1}f\!f\cdot\Delta_x f\!f\times\Delta_y f\!f \qquad (3)$$

where:

$$\Delta_x f\!f(x,y)=f\!f(x+1,y)-f\!f(x,y) \ (x\neq W-1)$$

$$\Delta_x f\!f(x,y)=f\!f(0,y)-f\!f(W-1,y) \ (x=W-1)$$

$$\Delta_y f\!f(x,y)=f\!f(x,y+1)-f\!f(x,y) \ (x\neq H-1)$$

$$\Delta_y f\!f(x,y)=f\!f(x,0)-f\!f(x,H-1) \ (x=H-1)$$

"x=0" and "W-1" in $\Sigma_{x=0}^{W-1}$ indicate that the range of the sum is x=0 to W-1.

Lastly, the integer closest to the computation result is output as a digital watermark value.

Figure 19:
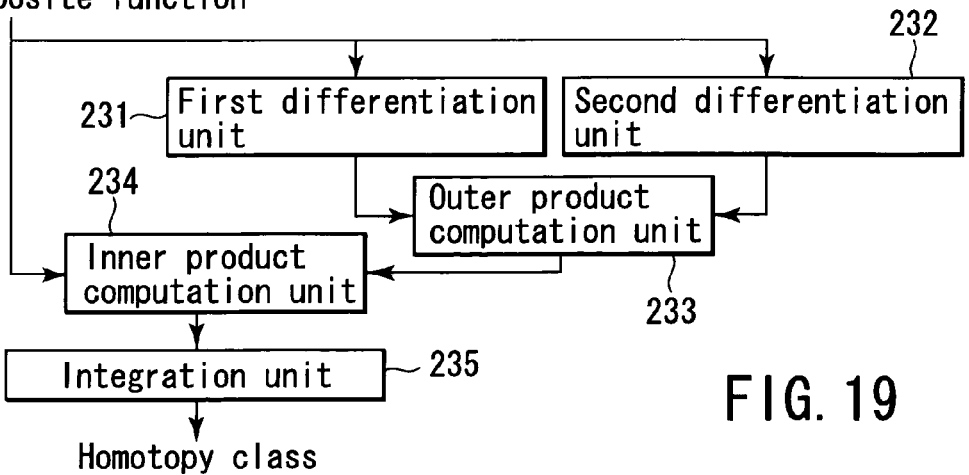
FIG. 19 shows a configuration example of a homotopy class computation unit in the embodiment.

FIG. 19 shows a configuration example of the homotopy class computation unit 23.

A first differentiation unit 231 computes an x-directional differential, and a second differentiation unit 232 computes a y-directional differential. An outer product computation unit 233 computes the outer product of the two differentials (differences), and an inner product computation unit 234 computes the inner product of the first-mentioned inner product and the original function. Lastly, an integration unit 235 integrates inner products obtained in the entire base space B. When necessary, the integration result is rounded into an integer.

In the above embodiment, processing is performed on the basis of the number 6g of frames. However, four frames may be connected vertically and horizontally and regarded as one frame (in this case, processing is performed on the basis of a number 24g of frames). Alternatively, one frame may be divided vertically and horizontally into four frames regarded as serial frames (in this case, processing is performed on the basis of a number 6g/4 of frames).

Although, in the embodiment, a monochrome image has been used as an example, the embodiment is also applicable to a color image. In this case, processing similar to the above may be performed, using, for example, the Y-component of a number g of first pixels, the Y-component of the number g of second pixels, the U-component of the number g of first pixels, the U-component of the number g of second pixels, the V-component of the number g of first pixels, and the U-component of the number g of second pixels, as groups G0, G1, G2, G3, G4 and G5, respectively. Alternatively, similar processing may be performed on condition that only the Y-component is used. This processing can be modified in various manners. Also in a color image, any type of grouping may be employed. It is sufficient if the attachment relationship between the components, frames and groups is preset.

Although in the embodiment, moving picture data is employed as an example, the embodiment is also applicable to still image data. In this case, for example, a still image is divided into a number 6g of portions, and each portion is regarded as one frame during processing.

Furthermore, in the embodiment, differences concerning the pixel values of adjacent two groups (each consisting of, for example, a number g of pixels) are used to embed digital watermark information. However, digital watermark information may be directly embedded in a single group (that consists of, for example, a number g of pixels).

The above-described embedding methods are just examples, and other embedding methods may be utilized.

In the embodiment, when watermark information is embedded in target digital content (e.g. image data), a predetermined topological invariant (e.g., a homotopy invariant) corresponding to watermark information to be embedded in the target content is acquired, and is set in the target content by changing a predetermined portion of the target content.

Further, in the embodiment, when the watermark information embedded in content is detected, a predetermined topological invariant set in the content is detected on the basis of a predetermined portion of the content, and watermark information corresponding to the detected topological invariant is output.

For example, when control information that allows copying is embedded as watermark information, if, for example, the entire homotopy classes and the entire integers Z are isomorphic, the pixel values are changed so that the homotopy class=+1 (a value other than +1 may be set) is satisfied. On the other hand, if copying is not allowed, the pixel values are changed so that the homotopy class=−1 (a value other than −1 may be set) is satisfied. Further, when, for example, the identification number of a copyright holder is embedded as watermark information, the pixel values are changed so that if identification number 1 is designated, the homotopy class=1 (a value other than 1 may be set) is satisfied. Further, if identification number 2 is designated, the homotopy class=2 (a value other than 2 may be set) is satisfied.

In the embodiment, since a topological invariant corresponding to to-be-embedded watermark information is set in target content, the topological invariant set in the content is maintained and preserved even if local transformation, such as StirMark attack or D-A-D conversion, is made on the content in, for example, a distribution channel. Regardless of whether local transformation is made on content, a correct topological invariant can be detected in the content, and corresponding correct watermark information can be acquired.

Furthermore, the influence upon content can be minimized by writing, into the content, data that expresses a topological invariant so that the range of variations in the bit string of content is small.

In addition, in the embodiment, when watermark information is embedded, the topological function (i.e., function corresponding to the topological invariant) (values) is not embedded, but the first composite function (i.e., function by composition of the randomizing function and the topological function) (values) obtained by randomizing the topological function on the basis of key information is embedded. Therefore, when the watermark information is detected, the topological invariant cannot be detected from the embedded-function (i.e., function embedded in the target content) (values). Only when key information corresponding to the key information used for embedding is provided, ordering processing based on this key information is performed, thereby acquiring the second composite function (i.e., function by composition of the ordering function and the embedded-function) (values) (if the key information is correct, the second composite function (values)=the topological function (values)), and acquiring a correct topological invariant from the second composite function (values). It is difficult to detect even the existence of digital watermark information from the embedded-function (values). Even if the embedded-function is detected beforehand, a correct topological invariant cannot be detected. Without correct key information, a correct topological invariant cannot be acquired even from the second composite function (values).

The randomizing and ordering processes employed in the embodiment differ from the conventional scrambling and descrambling processes. In the prior art, if image data is subjected to geometrical distortion after it is scrambled, it may not be restored to the original one even by descrambling. On the other hand, in the embodiment, even if image data is subjected to geometrical distortion after it is randomized based on key information, it can be restored to the original one by an ordering process based on key information.

As described above, the embodiment can provide digital watermark information that shows a high robustness against local transformation, such as StirMark attack or D-A-D conversion, and is still safe even if all or part of the algorithm for generating the digital watermark information is disclosed.

Further modifications of the embodiment will now be described in detail.

In each of the above-described configurations, a description has been made, regarding the base space and target space as spaces $S^2$. However, another type of space, such as a non-obvious topological base space or target space, may be employed.

For example, the base space can be regarded as a torus $T^2$ by considering that the upper and lower ends of an image are equivalent and the left and right ends of the image are equivalent.

A variation in the function indicative of an embedded image will now be described.

A function representing an embedded image is set so that the change of the function in the vicinity of the periphery of the image is gentler and that the function has values gradually closer to a certain value at positions closer to the periphery. By doing so, if a part of the image in the vicinity of the center of the image is cut, the lost peripheral portion has a smaller influence on an integral value. Accordingly, if an image or a content has an important content concentrated in the vicinity of the center thereof (it is considered that there are many contents of this type), it is possible to realize resistance against the cutting to some extent. Normally, even if only the important part is cut, it is possible to leave the digital watermark by setting the function is set so as to have large change on the important part of the image.

Variation in the processing performed on voice data will be described.

A description has been given of the case where an image is used as target content. However, the embodiment is also applicable to digital content of other media. For example, the method disclosed in Jpn. Pat. Appln. KOKAI Publication No. 2002-142094 may be used for voice or music digital content.

Variation in topological invariant will be described.

Although the embodiment employs a homotopy class as a topological invariant, other types of topological invariant can also be used.

A large number of elements are known as invariants, as well as the elements of homotopy groups. They include, for example, homology groups, cohomology groups, characteristic classes, such as Stiefel-Whitney class, Chern class and Pontryagin class in a vector bundle, the Euler number, index or signature of a manifold. They also include an Alexander invariant concerning a knotted thread, and Milnor invariant concerning an entwined thread. Concerning the above, see, for example, Iwanami Mathematic Dictionary 3rd Edition, edited by Mathematical Society of Japan and published by Iwanami Shoten Publishers.

Concerning the homotopy groups, integrals given by, for example, the Gauss-Bonnet theorem are used in the embodiment. However, in the case of a characteristic class, such as Chern class, integrals given by the Atiyah-Singer index-number theorem can be used. In this case, it is sufficient if integration amounts for extracting the invariants of homotopy groups, instead of the integration amounts employed as examples for the homotopy groups.

The hardware and software configurations employed in the embodiment will be described.

The digital watermark embedding apparatus of the embodiment can be realized by only hardware or using software (a program for instructing a computer to execute predetermined means, or for instructing a computer to function as predetermined means, or for instructing a computer to realize a predetermined function). When the digital watermark embedding apparatus is realized using software, programs can be transferred via a recording medium. The same can be said of the digital watermark detection apparatus.

Further, when the digital watermark embedding and detection apparatuses are realized by hardware, they can be made as semiconductor apparatuses.

In addition, when the digital watermark embedding apparatus or program according to the invention is constructed, if they incorporate blocks or modules of the same configuration, these blocks or modules may be prepared individually. Alternatively, instead of preparing all blocks or modules of the same configuration, one or some blocks or modules may be commonly used when some sections of an algorithm are executed. The same can be said of the digital watermark detection apparatus or program. Further, when a system that includes the digital watermark embedding and detection apparatuses, or a system that includes the digital watermark embedding and detection programs is prepared, one or some blocks or modules of the same configuration may be used commonly by some sections of an algorithm.

When the digital watermark embedding or detection apparatus is realized using software, a multiprocessor may be used to perform parallel processing, thereby increasing the processing speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital watermark embedding apparatus including a processor, the digital watermark embedding apparatus comprising:

an acquisition unit to acquire a topological invariant as digital watermark information, key information corresponding to the digital watermark information, and a target content in which the digital watermark information is to be embedded;

a function generation unit coupled to the acquisition unit, the function generation unit being configured to generate a topological function corresponding to the topological invariant;

a function randomization unit coupled to the function generation unit, the function randomization unit being configured to generate, based on the key information, a randomizing function, map each block of the target content to a target space based on the randomizing function, the target space comprising embedding amounts, and compute a composite function based on the randomizing function and the topological function; and a function-embedding unit coupled to the function randomization unit, the function-embedding unit being configured to embed the digital watermark information in the target content based on the composite function, wherein the target content is restored even if the target content with embedded digital watermark information is subjected to geometrical distortion.

2. The digital watermark embedding apparatus according to claim 1, wherein the topological function includes a mapping from a base space concerning positions in the target content to the target space concerning embedding amounts, the mapping being based on the topological invariant.

3. The digital watermark embedding apparatus according to claim 2, wherein:

the target content includes one of still image data and moving picture data;

the base space is defined by pixel positions corresponding to the target content; and the target space is included in a topological space corresponding to a set of assignments of values to pixels composing the target content.

4. The digital watermark embedding apparatus according to claim 1, wherein the function generation unit generates topological function values which express the topological function.

5. The digital watermark embedding apparatus according to claim 4, wherein the function randomization unit generates composite function values by applying the randomizing function to the topological function values, the composite function values expressing the composite function.

6. The digital watermark embedding apparatus according to claim 5, wherein each of the topological function values and the composite function values indicate embedding amounts corresponding to positions in the target content.

7. The digital watermark embedding apparatus according to claim 5, wherein the function randomization unit randomizes the topological function values using a block cipher based on the key information to generate the composite function values.

8. The digital watermark embedding apparatus according to claim 5, wherein the function-embedding unit embeds the topological invariant by varying the target content based on the composite function values.

9. The digital watermark embedding apparatus according to claim 1, wherein the function generation unit generates the topological function corresponding to the topological invariant which includes a homotopy invariant.

10. A digital watermark detection apparatus including a processor, the digital watermark embedding apparatus comprising:

an acquisition unit to acquire key information corresponding to digital watermark information, and a target content in which the digital watermark information is embedded;

a function detection unit coupled to the acquisition unit, the function detection unit being configured to detect a function embedded in the target content;

a function ordering unit coupled to the function detection unit, the function ordering unit being configured to generate, based on the key information, an ordering function, map each block of the acquired target content with embedded digital watermark information to a randomized space comprising embedding amounts, and compute a composite function based on the ordering function and the embedded function; and a topological invariant computation unit coupled to the function ordering unit, the topological invariant computation unit being configured to compute a topological invariant based on the composite function, the topological invariant serving as digital watermark information, wherein the function ordering unit restores the embedded target content original target content even if the embedded target content was subjected to geometrical distortion.

11. The digital watermark detection apparatus according to claim 10, wherein the composite function includes a mapping from a base space concerning positions in the target content to the target space concerning embedding amounts, the mapping being based on the topological invariant.

12. The digital watermark detection apparatus according to claim 11, wherein:
the target content includes one of still image data or moving picture data;
the base space is defined by pixel positions corresponding to the target content; and
the target space is included in a topological space corresponding to a set of assignments of values to pixels composing the target content.

13. The digital watermark detection apparatus according to claim 10, wherein the function detection unit detects function values which express the embedded function.

14. The digital watermark detection apparatus according to claim 13, wherein the function ordering unit generates composite function values by applying the ordering function to the function values, the composite function values expressing the composite function.

15. The digital watermark detection apparatus according to claim 14, wherein each of the function values and the composite function values indicate embedding amounts corresponding to positions in the target content.

16. The digital watermark detection apparatus according to claim 14, wherein the order-function generation unit orders the function values using a block cipher based on the key information to generate the composite function values.

17. The digital watermark detection apparatus according to claim 14, wherein:
the composite function includes a mapping from a base space concerning positions in the target content to a target space concerning embedding amounts, the mapping being based on the topological invariant, the composite function including a parameter which is related to the topological invariant and determines the mapping; and
the topological invariant computation unit computes the topological invariant by acquiring the parameter based on the composite function values.

18. The digital watermark detection apparatus according to claim 10, wherein the topological invariant computation unit computes the topological invariant which includes a homotopy invariant.

19. A digital watermark embedding method comprising:
acquiring a topological invariant as digital watermark information, key information corresponding to the digital watermark information, and a target content in which the digital watermark information is to be embedded;
generating a topological function corresponding to the topological invariant;
generating, based on the key information, a randomizing function;
mapping each block of the target content to a target space based on the randomizing function, the target space comprising embedding amounts;
computing a composite function based on the randomizing function and the topological function; and
embedding the digital watermark information in the target content based on the composite function,
wherein target content is restored even if the target content with embedded digital watermark information is subjected to geometrical distortion.

20. A digital watermark detection method comprising:
acquiring key information corresponding to digital watermark information, and a target content in which the digital watermark information is embedded;
detecting a function embedded in the target content;
generating, based on the key information, an ordering function;
mapping each block of the acquired target content with embedded digital watermark information to a randomized space comprising embedding amounts;
computing a composite function based on the ordering function and the embedded function; and
computing a topological invariant based on the composite function, the topological invariant serving as digital watermark information,
wherein the embedded target content is restored to original target content even if the embedded target content was subjected to geometrical distortion.

21. A computer-readable storage medium storing a program for enabling a computer to function as a digital watermark embedding apparatus according to a method, the method comprising:
instructing the computer to acquire a topological invariant as digital watermark information, key information corresponding to the digital watermark information, and a target content in which the digital watermark information is to be embedded;
instructing the computer to generate a topological function corresponding to the topological invariant;
instructing the computer to generate, based on the key information, a randomizing function;
instructing the computer to map each block of the target content to a target space based on the randomizing function, the target space comprising embedding amounts;
instructing the computer to compute a composite function based on the randomizing function and the topological function; and
instructing the computer to embed the digital watermark information in the target content based on the composite function,
wherein the target content is restored even if the target content with embedded digital watermark information is subjected to geometrical distortion.

22. A computer-readable storage medium storing a program for enabling a computer to function as a digital watermark detection apparatus according to a method, the method comprising:

instructing the computer to acquire key information corresponding to digital watermark information, and a target content in which the digital watermark information is embedded;

instructing the computer to detect a function embedded in the target content;

instructing the computer to generate, based on the key information, an ordering function;

instructing the computer to map each block of the acquired target content with embedded digital watermark information to a randomized space comprising embedding amounts;

instructing the computer to compute a composite function based on the ordering function and the embedded function; and instructing the computer to compute a topological invariant based on the composite function, the topological invariant serving as digital watermark information, wherein the embedded target content is restored to original target content even if the embedded target content was subjected to geometrical distortion.

* * * * *